US010188080B2

(12) United States Patent
Jasmine, Sr.

(10) Patent No.: US 10,188,080 B2
(45) Date of Patent: Jan. 29, 2019

(54) FULL 360 DEGREES HANDS-FREE LEASH ATTACHMENT UNIT

(71) Applicant: Andrew Jasmine, Sr., Vacherie, LA (US)

(72) Inventor: Andrew Jasmine, Sr., Vacherie, LA (US)

( * ) Notice: Subject to any disclaimer, the term of this patent is extended or adjusted under 35 U.S.C. 154(b) by 85 days.

(21) Appl. No.: 15/145,122

(22) Filed: May 3, 2016

(65) Prior Publication Data

US 2016/0324125 A1    Nov. 10, 2016

Related U.S. Application Data

(60) Provisional application No. 62/157,206, filed on May 5, 2015.

(51) Int. Cl.
*A01K 27/00* (2006.01)
*A01K 29/00* (2006.01)

(52) U.S. Cl.
CPC .......... *A01K 27/003* (2013.01); *A01K 27/001* (2013.01); *A01K 27/005* (2013.01); *A01K 29/00* (2013.01)

(58) Field of Classification Search
CPC .. A01K 27/001; A01K 27/003; A01K 27/005; A01K 29/00; A01K 1/04; A01K 27/00; A01K 27/002; A01K 1/06; A41F 9/002; A47D 13/086; F16C 29/005
USPC ..... 119/769, 770, 771, 795, 856, 857; 70/16
See application file for complete search history.

(56) References Cited

U.S. PATENT DOCUMENTS

| | | | | | |
|---|---|---|---|---|---|
| 380,441 | A | * | 4/1888 | Hyatt | 70/16 |
| 5,080,045 | A | * | 1/1992 | Reese | A01K 27/005 119/770 |
| 5,842,444 | A | * | 12/1998 | Perrulli | A01K 27/00 119/770 |
| 6,837,188 | B1 | * | 1/2005 | Martin | A01K 27/005 119/792 |
| 2004/0112303 | A1 | * | 6/2004 | Moulton, III | A01K 27/00 119/795 |
| 2005/0229867 | A1 | * | 10/2005 | Green | A01K 27/00 119/770 |
| 2010/0089338 | A1 | * | 4/2010 | Stern | A47D 13/086 119/770 |
| 2013/0042819 | A1 | * | 2/2013 | Ekstrum | A01K 27/00 119/770 |
| 2015/0013619 | A1 | * | 1/2015 | Kahana, Jr. | A01K 1/04 119/770 |

* cited by examiner

*Primary Examiner* — William V Gilbert

(57) ABSTRACT

A full 360 degrees hands free leash attachment unit is disclosed for walking or running with a dog, used as a child restraint and for construction workers or the like. It consist of an outer member that attaches around the waist area of a person. And, there is also a functional inner member and a leash attachment element which connects to it. Another embodiment has a circular waist member with a double curved inward design. And, another embodiment has a circular waist member with an extended lower shelf all around and, an alternate waist member with plastic pipe caps installed all around. All of the embodiments uses the inner spinner and the leash attachment element.

4 Claims, 9 Drawing Sheets

These are 1 inch caps with 1 x 1/2 inch reducers.

FULL 360 DEGREES HANDS-FREE LEASH ATTACHMENT UNIT

FIELD OF THE INVENTION

The present invention relates to 360 degrees hands-free leash waist attachment devices for attaching around the waist area of a human person which will allow a dog or a child to move freely in any direction and even circle around a person. And, for construction workers safety!

BACKGROUND OF THE INVENTION

In the field of devices used as a full 360 degrees hands-free leash waist attachment means for walking, jogging or running with your dog, as a child restraint or construction work, many leash systems are unsuitable for this need. The world-wide use of a standard leash has always been a problem when doing any outside activity with your dog. Using a common leash, you must always have to use one of your hands to maintain control of the leash which place stress and strain on your fingers, hands, arms, shoulders, neck, legs and your upper and lower back area. Also, as a dog moves in different directions from front to back, left to right & around & around their owners, that owner will have to keep switching the leash from one hand to the other or get tangled up in the leash. A dog is also under tremendous stress with a standard leash, because their owners will limit their movements while being outside to exercise and enjoy themselves. The animal have to stay in one position or another and cannot roam freely especially fully around and around their owners without being fussed at or yanked back to the original position. This present invention is generally related to a full 360 degrees hands-free leash attachment unit worn around the waist area of a human person when walking, running or just being outside exercising with their dog, and, as a child restraint for their parent to wear and even for construction workers safety to attach around their waist area and then connect a leash or tether to an object.

SUMMARY OF THE INVENTION

The present preferred embodiment for this invention being disclosed about a full 360 degrees hands-free leash attachment unit dramatically shows and has an advantage over the prior arts for having an ultimate design and a 100 percent workable hands-free leash system. The benefits of the present invention improves beyond the prior arts: the material of manufacture, it's overlapping & self-locking ability, constructive design, comfort, ease of use, a loop-around inner-spinner member, it's functionality, flexibility, smooth operation and the objective of having and using a full 360 degrees hands-free leash attachment unit for dogs, as a child restraint, for construction workers or the like. The present invention allows for a user to have an advanced hands free leash for walking, jogging or running with their dog while putting less strain on the owner and their pet. Because, it's ease-of-use allows a dog to move around in any direction, while being strapped to a leash, without being fussed at!

The primary aspect of this invention is to have a full 360 degrees hands-free dog leash unit that can wrap around the waist area of a human person that consist of a large in-diameter flexible outer hose that has a full length outer wall cut out that gives it the means to overlap into itself to connect, adjust and to lock into itself because of it's rubber type material makeup and has a secondary flexible corrugated inner hose which also has it's full length outer wall cutout allowing it to easily be installed inside of and around the inner wall of the flexible outer hose for a secure inside fit by overlapping into itself to connect, adjust and lock into itself by means of it's corrugated material design makeup of ridges and grooves. Then, an inner-spinner mechanism is installed and fed into the cut out of the secondary flexible inner hose which is inside of and around the inner wall of the flexible outer hose forming a loop around the inside of this unit. This mechanism that consist of a rope or a chain or the like that has a connection means is then connected and adjusted loosely to easily spin around with a slight drag in any direction is then locked inside. Then, a leash attachment combo mechanism consisting of a swivel hook with an o-ring attached to it is connected to the inner-spinner mechanism's d-ring. Then, the hand-holding loop part of a leash is looped through and around the large o-ring and the leash itself swivel hook is attached to the collar that's around a dog's neck.

And, this self-supporting unit does not use a belt or the like. Also, this full 360 degrees hands-free leash attachment unit does not grab any clothing worn by a user as it is operating.

Another embodiment of a full 360 degrees hands-free leash attachment unit is provided as having a double-curved automobile-tire-rim-like circular design consisting of a two piece waist attachment component. It is made of a flexible plastic type of material or an alternate material. These two pieces are curved in a half-circular design and each piece is curved inward in the middle area and, this unit is also designed to be worn around the waist area of a person. In the rear center there is a door like hinge attached to the inside part of these two pieces which connects both pieces together. This hinge allows the front portion of this unit to be opened up widely so it can be connected, adjusted and locked around the waist area of a user. Now, the rope or chain inner-spinner mechanism is simply wrapped around the center of this double curved-inward waist component, connected & then adjusted with a slight drag to allow it to freely spin around and around. And, the leash attachment combo is also used.

And, another embodiment of a full 360 degrees hands-free leash attachment unit. This unit is provided as having a single piece of wide-flexible plastic type material or other material that has an outer shelf-like or a ledge extension that goes around the lower half of the full waist component. There is gap in this shelf at the rear center area with two elongated holes of this one piece unit to allow it to be a little more flexible to open up widely to be wrapped around a person's waist and connected in the front area. A rope or chain inner-spinner mechanism is simply wrapped around this unit and sits right on top of the shelf-like outer extension of this waist component, and then adjusted with a slight drag to allow it to easily spin around the unit in a smooth manner. And, the leash attachment combo is also used.

And, according to even another embodiment, a full 360 degrees hands-free leash attachment unit is disclosed as having a single piece of a wide flexible plastic type material or other material which is being used as a waist attachment component.

The center of it's rear portion is more flexible (if needed) so it can open widely to be wrapped around, connected, adjusted and locked to a person's waist area in the front part of this component. This waist component has certain-size holes beneath it's center area, that goes around it's full length. These holes are spaced out and are being used to install PVC plastic pipe reducers through them from inside to out, and then, PVC plastic pipe caps are installed on the outside extended part of these reducers. So, you will have the caps along the outer wall of this waist component that goes all around it, and then, a rope or chain inner-spinner mechanism is easily placed around the unit and sits on top of these PVC plastic pipe caps, which may also spin around. A spinner mechanism is connected, adjusted and locked with a slight drag to allow it to easily spin and just ride around the center of this waist component on top of the plastic caps. And, the leash attachment combo is also used.

All of the components listed in this present invention's patent application are simple to connect, easy to use, easily adjusted to different size waist. And, the components of this invention will also be inexpensive to manufacture, colorful and would be appealing to millions of dog owners, people with children, construction companies and the like around the World!!!

NOTE! Other materials can be substituted for all components of these systems! Although various embodiment of drawings are described, it is to be understood that the present invention contemplates numerous variations, options, and alternatives.

NOTE! A full patent search was done of over 1,500+ applications of issued patents, published applications and other published documents. This major search was conducted using the USPTO Data Base, ESPACENET and GOOGLE PATENTS. Numerous hands free systems were found. Some systems use a loop type strap, a dual belt, a belt with added features, a ring, a metal slider, ball bearings, a harness and other components that allow a dog to move from side to side, back & forth, partially around and to allow for a full turn around a user's waist. Some of them are worn on your wrist, upper arm, over one shoulder, over both shoulders as a harness and has a track with a slider type piece, etc.

During this search, there were no patent applications found that were identical, included all of the pieces, parts, components, elements nor the functionality of the present invention being applied for. And, both waist attachment components of the preferred embodiment can overlap to connect, adjust and lock into themselves. Also, all other embodiment disclosures cannot be found either. So, there were no obviousness to an average person skilled in the arts found, nor did any application fit in the same proximity of the present invention of a FULL 360 DEGREES HANDS-FREE LEASH ATTACHMENT UNIT!

NOTE! The present invention, with all of it's alternate designs & their functionality and, the full and complete patent search that was done, to my knowledge Does not Exist!

NOTE! There is a need for an effective hands-free leash system that is simple, safe, light-weight and easy-to-use and that is not bulky. The present invention is primarily directed at overcoming these issues.

BRIEF DESCRIPTION OF THE DRAWING FIGURES

DETAILED DESCRIPTION OF THE PREFERRED EMBODIMENTS

The present invention provides for a FULL 360 DEGREES HANDS-FREE LEASH ATTACHMENT UNIT! This Invention is adapted to fit & connect around a person's lower waist area and for attaching a leash and the like. This system will free the hands (totally) to rest or to do other things with. It will also relieve the pressure, stress and strain placed on the fingers, hands, arms, shoulders, upper & lower back area and give your dog more freedom of movement in any direction. Although there are a few various embodiment of drawings being disclosed and described, it is to be understood that the present invention contemplates numerous variations, options, and alternatives.

Figure 1:
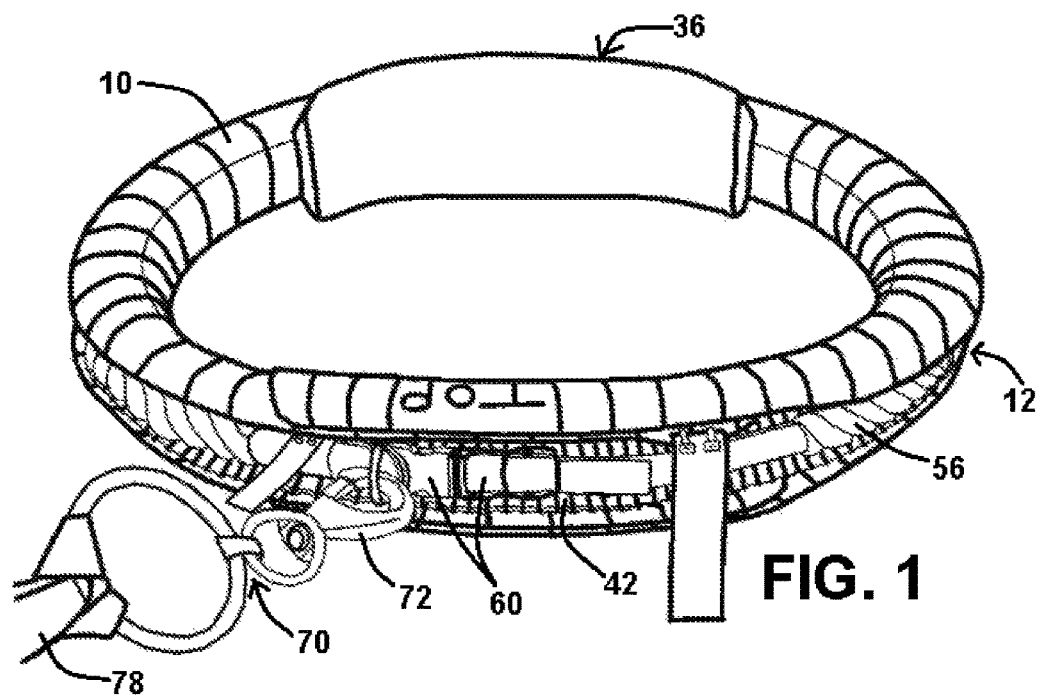
FIG. 1 is a full front and elevated rear view of the invention thereof.

Now, referring to all of the drawing figures in details about the invention in question! Here in FIG. 1, this drawing is showing the full design of the preferred embodiment of this present FULL 360 DEGREES HANDS-FREE LEASH ATTACHMENT UNIT to be used for walking-jogging-running with a dog, as a child restraint, for a construction worker and the like! First, there is a Flexible SPA Outer Hose 10. This hose has a certain width of it's outer wall cutout 12 for it's full length, that will allow it to be wrapped around a person's lower waist area, and this component can overlap, connect, adjust and then lock into itself. In the rear of component 10, there are two very soft cushion pads 36. There is a large outer with a smaller (unseen) inner pad that is better seen in FIG. 3. There is also a secondary Flexible Corrugated Vac Inner Hose 42 as an anti-friction added improvement that is about 6 inches or more longer than the SPA Hose which is inserted into and around the full inner wall of the SPA Hose 10. This hose also has it's full outer wall cutout (better seen later in FIG. 4) which helps this Vac Hose 42 to overlap, connect, adjust and to lock into itself too. This Vac Hose 42 is being used as a slippery plastic type inner piece that causes less drag than the SPA Hose 10 do.

The third and most important piece of this unit is a rope inner-spinner mechanism 56. This rope inner-spinner mechanism has a cut-in-half two piece dog collar 60 attached to it's ends which gives it the ability to install, connect, adjust and lock around the inside wall of the Vac hose 42, which is installed around the inside wall of the SPA hose 10. Note! This spinner component is adjusted loosely to have a slight drag while it spins around inside of the unit.

(There is also an alternate chain inner-spinner mechanism shown later in FIG. 11.) The drawing in FIG. 1 also shows a leash attachment combo 70 with a spring hook 72 for connecting to the dog collar 60 which is attached to the rope inner-spinner mechanism 56. And, a dog's leash 78 is attached to the leash attachment combo 70.

Note! This flexible SPA outer hose 10 waist attachment component also functions as a Stand-Alone waist attachment unit by means of adding a Silicon or Teflon Coating around the middle portion of it's full length inner wall or, Silicon Tape, Teflon Tape, a Plastic Strip or any other type of material that is out there as an anti-friction improvement. Then, there may not be a need for the Vac hose 42 in FIG. 4 as a secondary slippery plastic component!

Figure 2:
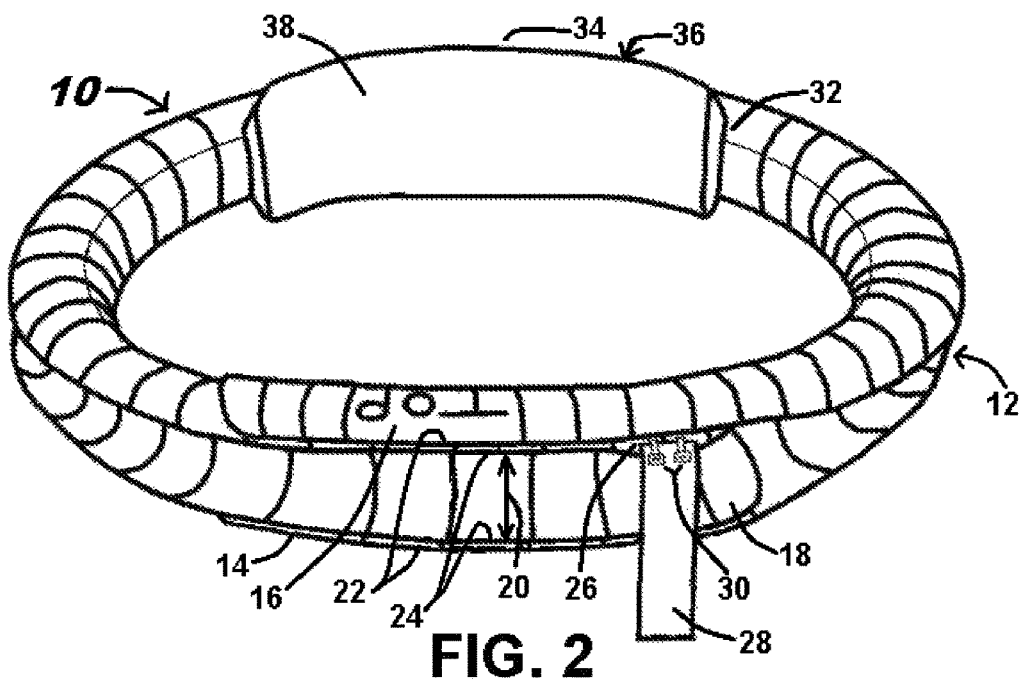
FIG. 2 is a front and elevated rear view of the main SPA outer hose locked into itself thereof.

FIG. 2 is a drawing that is showing a full front with an elevated rear view of only the flexible SPA outer hose 10 as it sits locked into itself. It will be measured and cut to fit with an 8-12 inches overlap, to attach around a person's lower waistline area from sizes small-medium, large-x large and 2× large & beyond! This flexible hose 10 has a cut out (slot) 12 for the full length of it's outer wall. Being inside, number 14 is the left end with the word TOP 16 marked on it, and 18 is the right end. There is a wider opening 20 showing it's width by illustration number 22 showing the left end 14, and number 24 showing the right end 18. These wider openings 20 will enable the right end 18 to be pressed into the left end 14 to fit snugged, adjusted and locked around the lower waist area of a user due to the SPA hose 10 rubber like material makeup. These wider opening 20 will be to the forefront of this SPA hose 10 component and, it will also serve another upcoming purpose too. Near the upper tip of the right end 18 is an extended lip 26 which is used to attach a disconnect pull-out strap 28 using two plastic ties 30. On the inside 32 of the elevated rear of the SPA hose 10 and centered 34 two (very soft) cushion pads 36 are attached which are being used to take up the open (ring like) space between the hose and the low back area of a user. There is a large outer pad 38 that completely covers an inner smaller pad.

Figure 3:
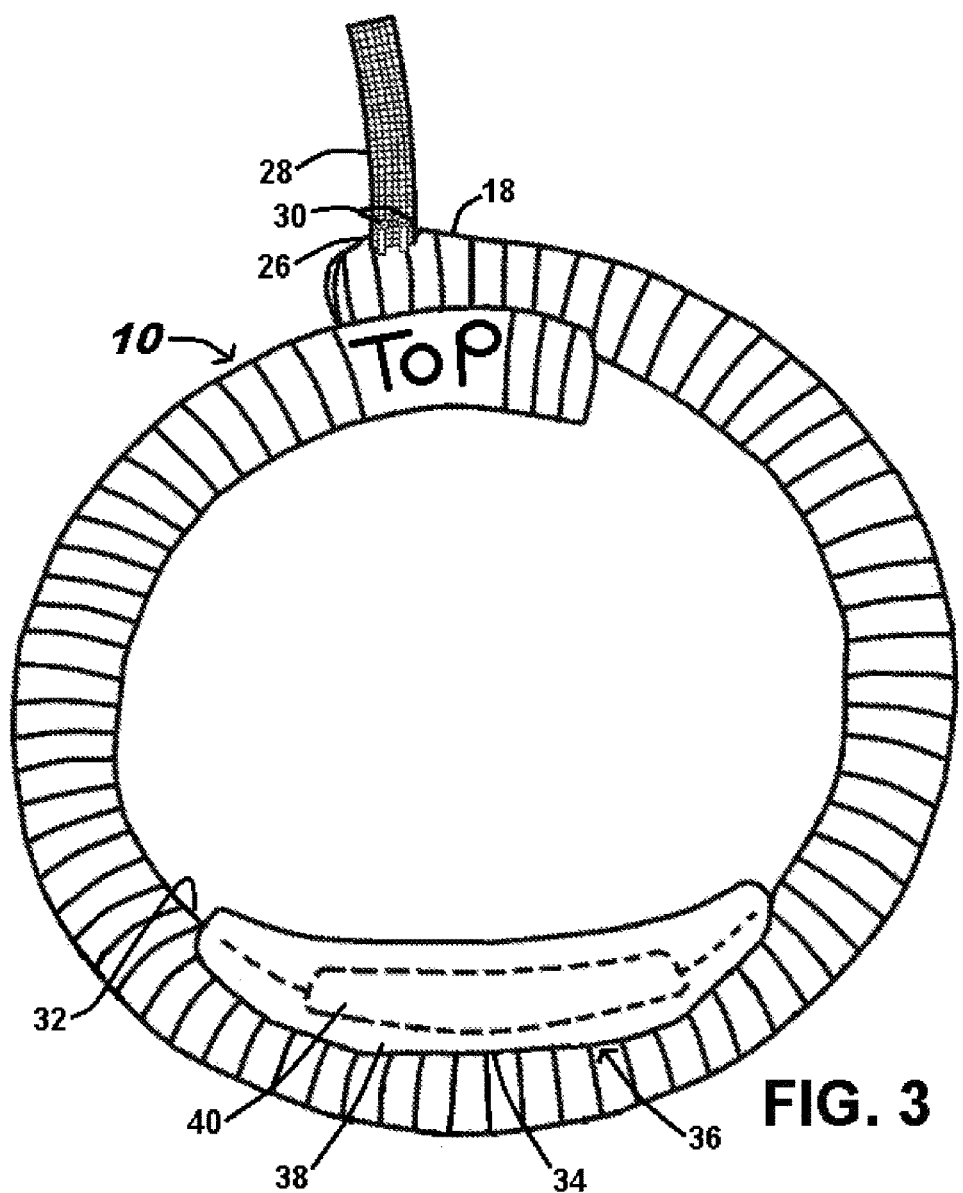
FIG. 3 is a top plan view of the outer hose partially unattached thereof.

Now here in FIG. 3 is a drawing showing an unconnected top plan view of the flexible SPA outer hose 10.

You can see the extended lip 26 of the right end 18 of the SPA hose 10 and also, the disconnect pull out strap 28 which is attached by using two holes and two plastic ties 30. FIG. 3 shows a good overhead view of being inside of the SPA hose 10! And, attached to the rear inside wall 32 at the center 34 of the SPA you have a better view of the two soft cushion pads 36, a larger outer 38 and a smaller inner 40.

Figure 4:
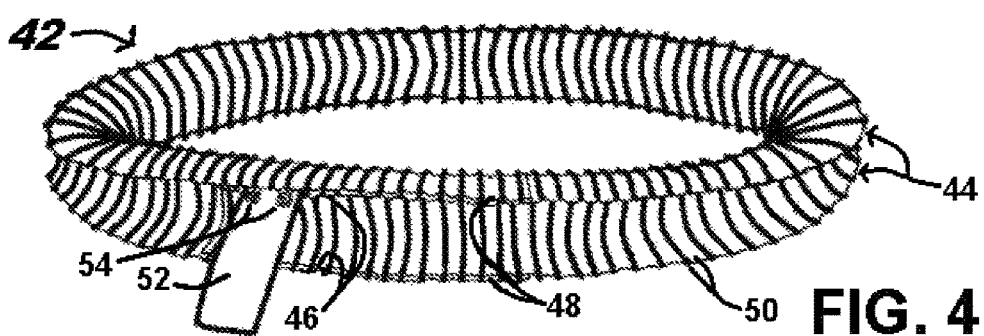
FIG. 4 is an elevated view of the secondary Vac inner hose locked into itself thereof.

FIG. 4 shows a drawing of an optional secondary Flexible Corrugated Vac/Drain Inner Hose 42 which sits overlapped and locked into itself. This Vac hose 42 also has it's full length outer wall cut out 44 that will enable it to be installed into and around the inner wall of the SPA hose 10. Then, it will overlap, connect, adjust and then lock into itself just like the SPA hose 10. The Vac hose 42 overlaps the opposite direction than the SPA hose 10. The left end 46 will be pressed into the right end 48 to be locked into itself with a tight fit due to it's corrugated design of ridges and grooves 50. On the upper left end 46 is a short extended lip that is used to attach a disconnect pull-out strap 52 by means of two plastic ties 54. NOTE! 1-2 inches of the tip of the right end 48 of the Vac hose 42 can be permanently attached to the inner wall, of the tip, of the right end 18 of the SPA hose 10 only a few inches inward!

Figure 5:
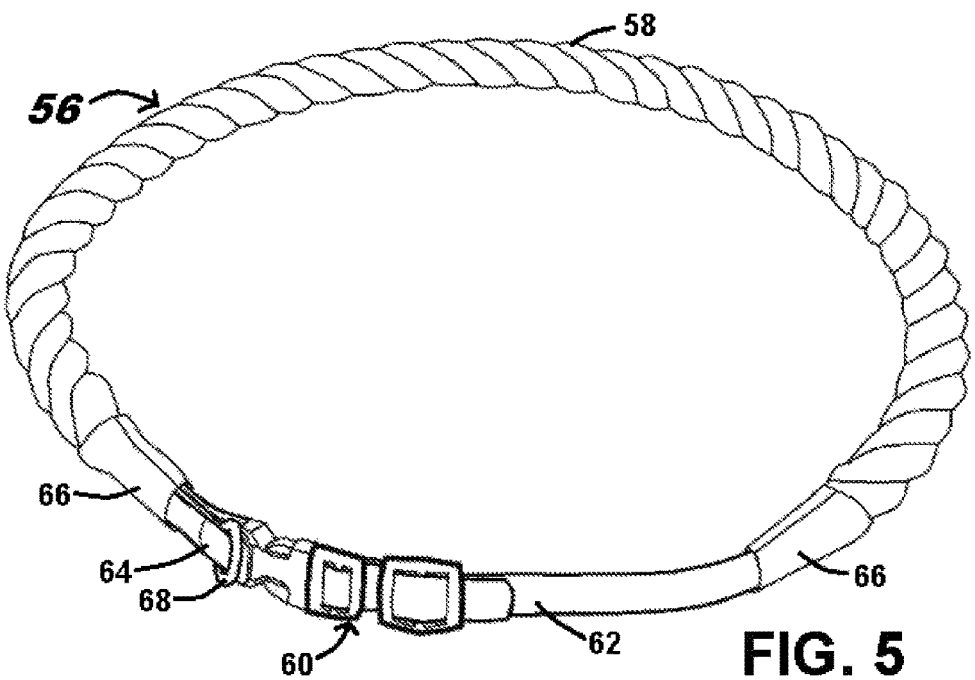
FIG. 5 is a drawing showing a semi-plan view of the rope inner-spinner mechanism thereof.

One of the main components to the functionality of this full 360 degrees hands-free leash attachment unit is the internal spinner mechanism . . . FIG. 5 is showing a front and rear plan view of a Rope Inner-Spinner Mechanism 56. This element is a combination of a piece of Twisted Yellow Polyurethane Rope 58 and a snap-lock dog collar 60 that is cut-in-half, two pieces 62 and 64. This mechanism is measured to fit around the inner wall of the Vac/Drain hose 42 of FIG. 4, which is inside of and around the inner wall of the SPA hose 10 of FIG. 2. The ends of this rope 58 and each dog collar pieces 62 and 64 are connected together inside of a piece of discharge hose 66. The d-ring 68 of the piece of dog collar 64 attached to one end of the rope 58 will have a very important connection use coming up later in FIG. 8. There are probably other types of materials that are slippery that could also be used as an inner-spinner mechanism too.

Figure 6:
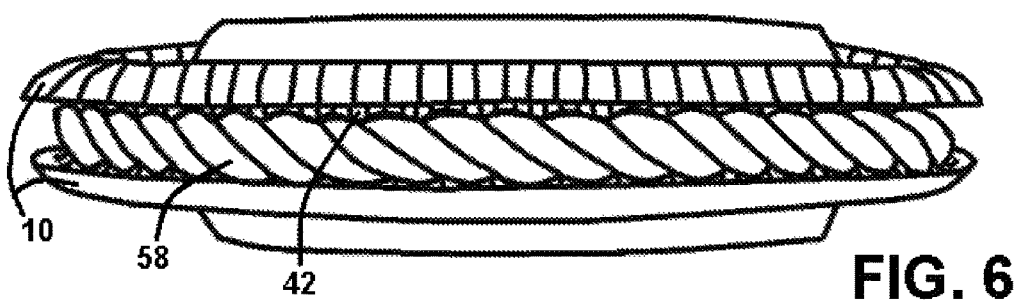
FIG. 6 is a perspective elevated rear view of the rope inner-spinner mechanism inside of the full unit thereof.

Here in FIG. 6 is showing a rear view of the full unit as in FIG. 1, and a rear view of the rope 58 of the inner-spinner mechanism 56 as it sits connected, adjusted and snapped locked by the two pieces of dog collar and wrapped around the inner wall of the Vac inner hose 42 which is connected, adjusted and locked into itself and wrapped around the inside wall of the SPA outer hose 10 of this full 360 degrees hands-free leash attachment unit.

Figure 7:
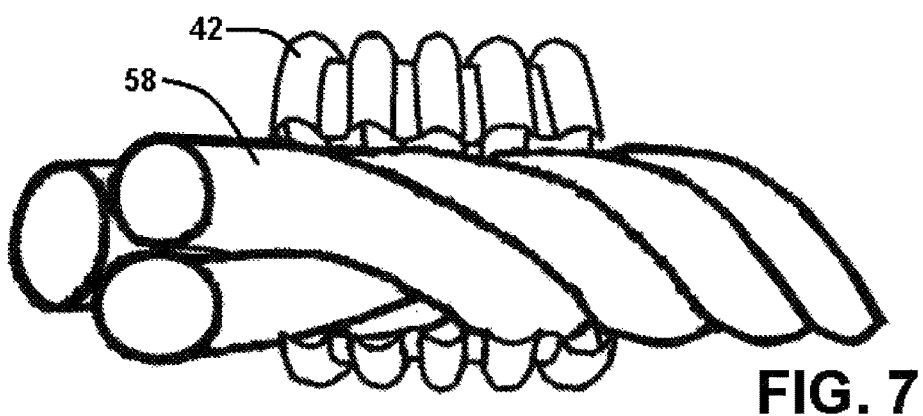
FIG. 7 is an enlarged sectional view of the rope inner-spinner mechanism inside the secondary Vac inner hose thereof.

FIG. 7 is an enlarged fragmented view of a section of the rope 58 from the rope inner-spinner mechanism 56 as it looks inside of the Vac hose 42.

Figure 8:
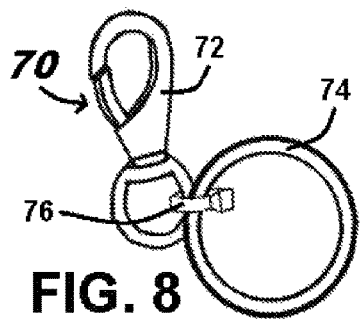
FIG. 8 is a top plan view of a leash attachment combo consisting of a large swivel hook and a large o-ring thereof.

Now, turning to the leash attachment combo element. FIG. 8 is a drawing showing a top plan view of the leash attachment combo 70 which comprises of a Stainless Steel Swivel Hook 72 that have a large O-ring 74 attached to it by means of a large plastic tie 76, it can also be attached by a spring chain link or other means. This swivel hook 72 will be used to connect to the dog collar 60 d-ring 68 that is attached to one end of the rope inner-spinner mechanism 58 in FIG. 5.

Figure 9:
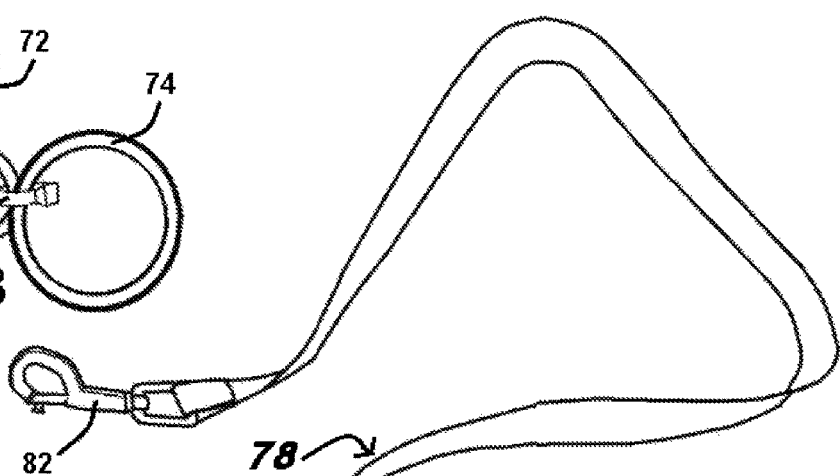
FIG. 9 is showing a top plan view of a standard leash hand-holding loop part being looped through the o-ring of the leash attachment combo thereof.

Now FIG. 9 is showing a top plan view of a standard dog leash 78 to which it's hand holding loop part 80 is attached to the leash attachment combo 70 by just looping the leash hand-holding part 80 through the large o-ring 74 and last, the leash 78 own swivel hook 82 on it's other end is for connecting to the d-ring of the collar around a dog's neck.

Figure 10:
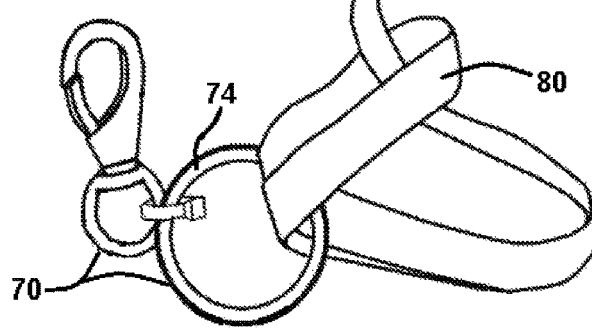
FIG. 10 is a detailed drawing showing the full & complete invention unit with the SPA & Vac hoses, the rope inner-spinner mechanism and the leash attachment combo thereof.

FIG. 10 shows a complete workable unit of the full 360 degrees hands-free leash attachment unit with all of it's components attached together that has been labeled and described in the figures beforehand. The arrows show how the rope inner-spinner mechanism can spin fully in any direction while it is wrapped around the inside wall of the Vac hose 42, which is itself wrapped around the inside wall of the SPA hose 10!

Next is a drawing showing an alternate embodiment of another inner-spinner mechanism!

This leash inner-spinner mechanism also works and functions very well inside of the leash attachment unit. It's a combination of a plastic chain, a dual-swivel, links & a dog collar belt. OK! This drawing in FIG. 11 is showing a top/overhead plan view of a chain inner-spinner mechanism 84. It consists of a plastic chain 86 that is strong and very light in weight. Two metal spring links 88 and 90 has been added to the ends of this chain. Now, a dog collar belt 92 has been cut-in-half, two pieces with the buckle piece 94 having the d-ring 96 on it. A loop 98 has been created with the extra strap on this piece of collar. This loop 98 has been connected to one of the metal spring links 88. Now, the other piece of collar with the adjustable strap 100 also needed a loop 102 to be created that will allow it to be connected to the second metal spring link 90. Now, it's ready for action and it's functionality!

Figure 12:
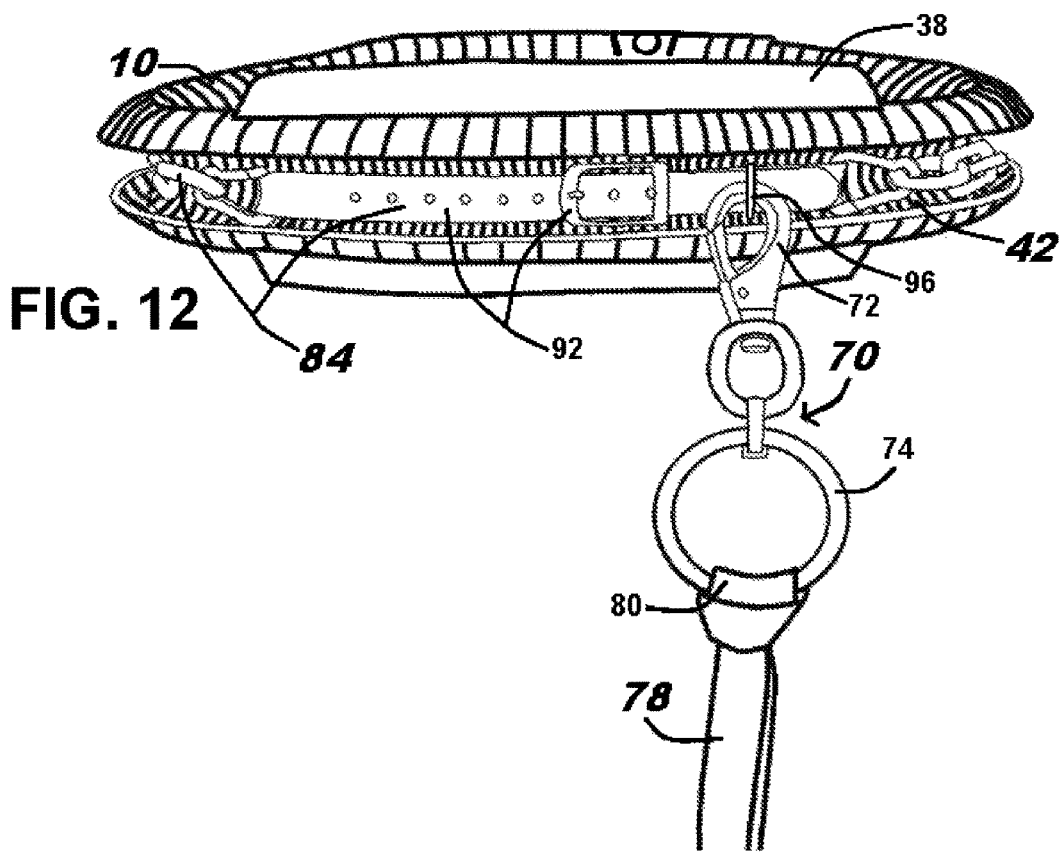
FIG. 12 shows a full perspective elevated rear view of the invention unit with the SPA & Vac Hoses, a front view of the connected chain inner-spinner mechanism's collar with the leash attachment combo swivel hook connected to it's d-ring & a leash around the o-ring thereof.

In FIG. 12 you are seeing a drawing of an up-close & a perspective view showing the rear part of the full 360 degrees hands-free leash attachment unit with a rear view of the large soft cushion outer pad 38 and a front view of the alternate chain inner-spinner mechanism 84 which has been installed. You can clearly see how this chain component looks inside of the full unit. Now, the SPA hose 10 would be wrapped around the lower waist area of a person and then, connected, adjusted and locked into itself. Then, the inner Vac hose 42 would be wrapped around the inner wall of the SPA hose 10 of the unit, then connected, adjusted and locked into itself too. Now as you can see, the chain inner-spinner mechanism 84 would be wrapped around the inner wall of the Vac hose 42 and then connected, adjusted (with a slight drag) and locked securely using this spinner's two pieces of a dog collar belt 92. Note! By adjusting this inner-spinner mechanism with a slight drag will allow it to spin around & around or any other direction smoothly inside of the unit. You are also seeing the leash attachment combo 70 in which it's swivel hook 72 is connected to the d-ring 96 of the chain inner-spinner's dog collar 92. And, the leash 78 hand-holding loop part 80 is shown looped through the o-ring 74 of the leash attachment combo.

Figure 13:
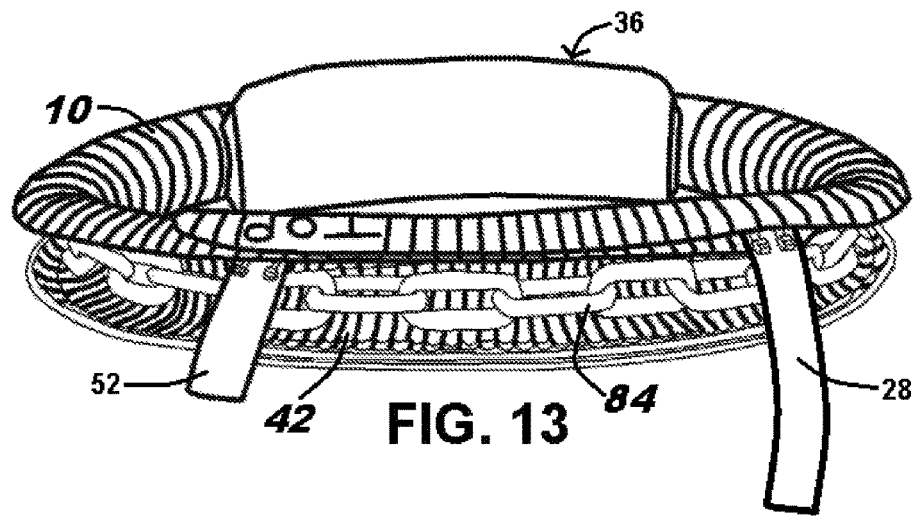
FIG. 13 shows a perspective elevated front and a full rear view of the unit with a rear view of the chain inner-spinner mechanism connected inside of the invention's unit hereof.

FIG. 13 shows a front view of FIG. 12 & rear view of the chain inner-spinner mechanism 84 inside. An alternate chain can be two-pieces joined as 1 by a double swivel with round eyes.

There is also the Vac hose 42 and it's disconnect pull out strap 52 and, there's the SPA hose 10 and it's disconnect pull out strap 28 and the cushion pads 36 in the rear.

How is this Unique Invention Used?

This invention is fairly easy to use. You have a certain size and length Flexible SPA Outer Hose 10, a smaller size Flexible Vac inner Hose 42 as an anti-friction added improvement that is cut about 6 inches or more longer than the SPA Hose, a Yellow Poly Rope Inner Spinner Mechanism 56 and, also a Plastic Chain Inner Spinner Mechanism 84.

Now, from an overhead view of the open/disconnected SPA hose 10 with TOP 16 showing, simply feed the right end 48 of the Vac hose 42 without the disconnect strap into the left end 14 with the word TOP of the SPA hose 10 all the way around it's inner wall and stop about 1 inch before the disconnect strap 28 of the right end of the SPA hose 10. Note! Right before this disconnect strap 28 is where about one inch of this end of the Vac hose can be permanently attached to the inside wall of the SPA hose 10 left end, but just this tip only!

Again! This flexible SPA outer hose 10 waist attachment component also functions as a Stand-Alone waist attachment unit by means of adding a Silicon or Teflon Coating around the middle portion of it's full length inner wall or, Silicon Tape, Teflon Tape, a Plastic Strip or any other type of material that is out there as an anti-friction improvement. Then, there may not be a need for the Vac hose 42 in FIG. 4 as a secondary slippery plastic component!

Once this Vac outer hose is installed or, if it's already permanently attached, you are going to notice that this Vac inner hose extends 4-6 inches out the left end 14 with TOP of the SPA hose. Now, you just have to open up the full 360 degrees hands-free leash attachment unit and place it around your lower waist area. Now, (while inside of the unit) pull out enough of the left end 46 (with the pull out strap) of the Vac hose 42, out of the left end 14 with TOP 16 of the SPA hose 10.

Then, grab the right end 18 of the SPA (with the right end 48 of the Vac hose 42 inside) and begin pressing them into the left end 14 with TOP 16 of the SPA hose into itself through the wider 1 inch cut out (slot) to lock.

Note! About 8-10 inches (inward) of the outer wall of both ends of the SPA hose has a wider cut out to allow for pressing the right end into the left end of the SPA hose so it can be adjusted to fit comfortably and locked into itself. Also, the SPA hose 10 will stay securely locked into itself with no need for any other locking means because of the friction from the rubber type material makeup. The Vac hose 42 will stay locked into itself, because of it's (corrugated) manufactured design which is made up of (humps and dips or say) ridges and grooves 50.

Then, take the exposed piece of the Vac hose and press it firmly back into the right end of the unit, but you must start pressing it in (while keeping it straight) from the last spot where the Vac hose 42 touches the inner wall of the SPA hose 10, and just work your way down to it's end/tip, and it should lock into itself due to it's ridges and grooves manufactured design.

Now, to install the yellow poly rope inner-spinner mechanism 56, you just have to press it in through the long cut out (slot) of both hoses to wrap it around the full unit. Then, you have to just connect the rope's two piece dog collar connection means, adjust this spinner a little loosely to allow it to spin with a slight drag and then lock it in, and then, confirm it's smooth full spinning ability by hand.

Next, you will have to take the hand holding part of your leash to simply loop it through the large o-ring 74 of the leash attachment combo 70. Then, the large swivel hook 72 of the leash attachment combo 70 just have to be connected to the d-ring 68 of the rope inner-spinner mechanism 56.

Then, the swivel hook on the other end of your leash just have to be connected to the d-ring on the collar that's around your dog's neck. Your leash can stay attached to the large o-ring of the leash attachment combo even after use too.

To remove this unit just reverse the process. First, remove the leash attachment combo's swivel hook, then disconnect the rope inner-spinner mechanism, then pull on the Vac hose pull out strap 52 to remove what's needed to free the pull out the Unit/SPA hose right end.

How does this Invention Function?

This invention is activated when an owner's dog starts walking, running or just constantly moving around their owner by means of a tug or pull of the leash which causes the leash attachment combo to pull on the d-ring of the two piece collar that is attached to the rope inner-spinner mechanism, which will then move to any direction back and forth, side to side or around and around and around!

During use, the rope or the chain inner-spinner mechanism glides, spins and is dragged around the inner wall of the Vac hose, because of the smooth & slippery material makeup of the poly rope or the plastic chain inner-spinner mechanism. And, the Vac hose also allows them to spin because of it's smooth plastic ridges and grooves which helps to prevent drag. So, any forceful tension on the leash, pulls on the large swivel hook of the leash attachment combo and causes the rope/chain spinner to move in any direction of this pull from the dog.

NOTE! At anytime, if the dog make's real close circles with the leash and it wraps around the legs of the user, you would simply just have to give the spinner mechanism a spin in the same direction as the leash to spin and unwind the leash from around your legs.

The cushion pad in the rear of the unit & SPA hose helps to cushion the extreme force of an ongoing forward pull on the leash from a dog and even sudden jerks forward too. The job of this cushion pad is also to fill in the gap at the rear due to the curving/circular shape of the invention in question! This circling action of the spinner is nice and smooth and, with being located inside of the waist unit, this will prevent any grabbing and twisting of a person's shirt and other clothing.

Figure 14:
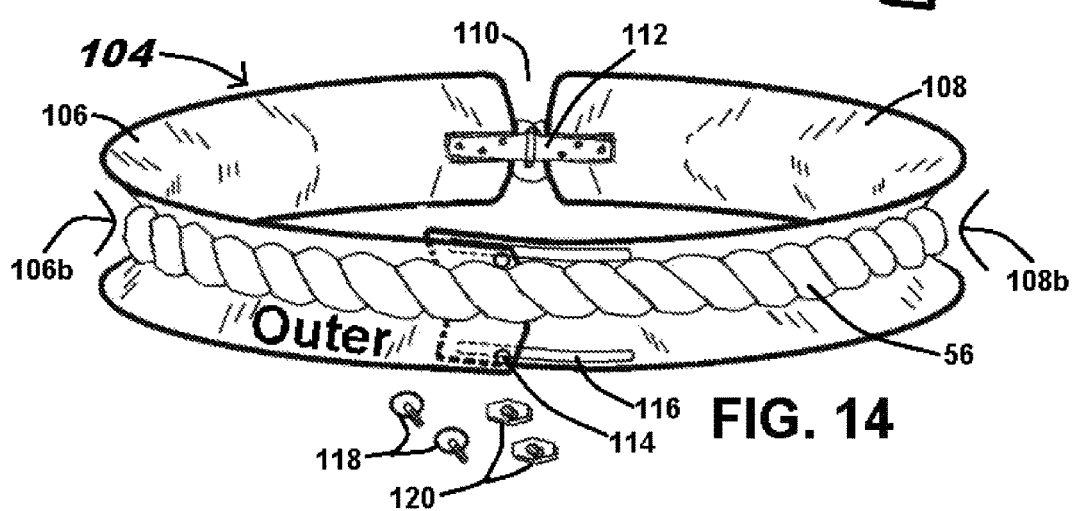
FIG. 14 is another embodiment of the invention in question showing a full front and rear perspective view of this design with the rope inner-spinner mechanism thereof.

According to a disclosure of another embodiment of this invention in FIG. 14, there is a drawing showing a second waist component 104 for the present invention which also provides for a full 360 degrees hands-free leash attachment unit! This drawing figure is showing a perspective and an inner rear view of unit 104 which has an automobile tire-rim like circular and curved inward design consisting of two pieces, side 106 and side 108 made of a flexible plastic type of material or an alternate type of material and even metal. These two pieces are a half circle and they are curved inward in the middle area 106*b* and 108*b*, that is designed to be comfortably worn around the waist area of a person. Located in the rear 110 and directly in the center of sides 106 and 108, there is a door like hinge 112 attached to the inside part of these two pieces which connects both pieces together by short screws, glue, etc. This hinge 112 allows the unit to be opened up widely so it can be wrapped and attached around the waist area of a user. There is also a connecting, adjusting & locking means located in the front portion of each piece/side of this unit. On the front of the right OUTER side 106 end, there are two bolt holes 114, one on the top and the bottom, and on the front end of the left side 108 there are two adjustable bolt hole slots 116 one on the top and the bottom. You are also seeing drawings of two short, flat & wide headed bolts 118 with two knob like nuts 120 which these nuts can be tightened securely by hand.

Figure 11:
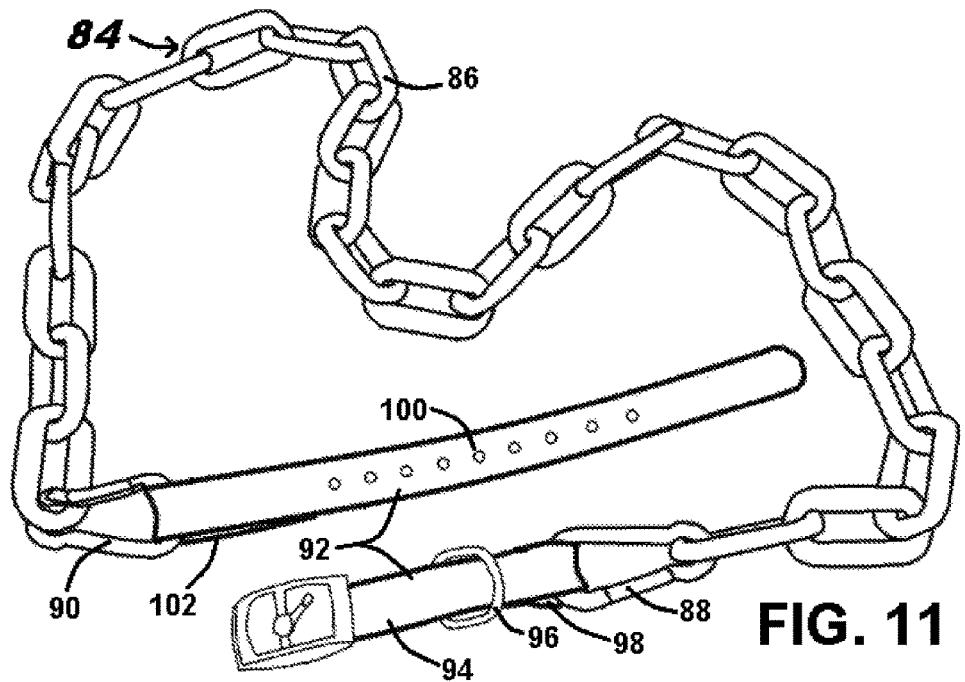
FIG. 11 is a top plan view of a chain inner-spinner mechanism thereof.

Once, these things above are done, this design also uses the same rope inner-spinner mechanism 56 of FIG. 5, and the same chain inner-spinner mechanism 84 of FIG. 11 and also, the same leash attachment combo 70 of FIG. 8 shown earlier. As you can see, the rope inner-spinner mechanism 56 is simply wrapped around the middle/center of the curved inner wall 106*b* and 108*b* of this two piece unit 104. To the rear & side and not seen is the rope inner-spinner's two piece dog collar 60 that has been connected and adjusted with a slight drag to allow it to easily spin around this unit. You can also see a clear view of how the full unit looks. Although various embodiment drawings are described, it is to be understood that the present invention contemplates numerous variations, options, and alternatives.

Figure 15:
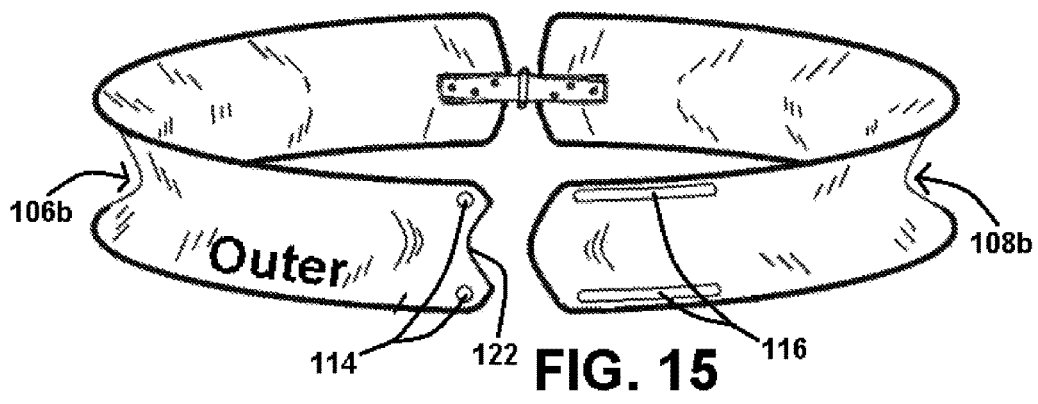
FIG. 15 shows another full front and rear perspective view of the embodiment of FIG. 14 while unconnected thereof.

FIG. 15 is showing an unconnected perspective front and inner rear view of this unit 104.

In FIG. 15, now you have a better view of the two bolt holes 114 and the two bolt holes adjustable slots 116 used to connect, adjust and lock the unit in the front area around a person's waist. You also have a terrific view of the inward curve of the walls of side 106*b* and side 108*b*. Note! On the front end/edge/tip of the right OUTER end 106 there is a wide curved 122 cut going inward and back out and has been rounded to prevent the rope or chain inner-spinner mechanism from jamming up or getting caught-up on the squared edge as it would make a full spin around the unit.

Figure 16:
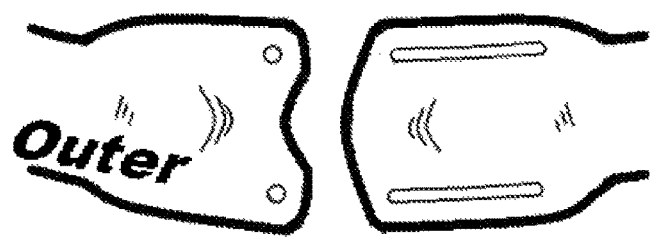
FIG. 16 shows an elevated sectional view of an alternate designed front attachment portion for the embodiment of FIG. 14 thereof.

As for FIG. 16, this is an exploded sectional view of an alternate front design for the unit 104. It is showing that the front connection area of both pieces 106 right and 108 left of the unit may need to be expanded a little taller than the height of the full unit if needed to prevent the lower nut from interfering with the spinner's ability to rotate around in a smooth manner!

TO MAKE? These two pieces of this waist component would be made as if manufacturing two pieces of a cut in half automobile rim, but leaving an extra extension in the front of each pieces to allow for an overlapping purpose. Then, they would go through a dual manufacturing mold to give them a dual curve in a circular shape and an inward depth design as 106 and 108. Then, there will be two bolt holes added to the end of the right OUTER piece 106 and two adjustable bolt hole slots added to the end of the left piece 108. And, in the rear center of each piece, there will be holes used to attach a door hinge like element to connect both pieces together as a one piece unit, that will allow this component to be opened up, wrapped, connected, adjusted and locked around a person's waist area.

TO USE? First, the threads of the bolts are placed from inside to out through the two adjustable bolt hole slots 116 of the left side 108, then the right OUTER side 106 end with the two bolt holes 114 just overlaps the left end 108 and the two bolts are simply pressed into these two bolt holes of the right OUTER end. Then, the two knob like nuts 120 are added to the two bolts thread that are sitting inside of the two adjustable bolt hole slots 116 and then, the unit is adjusted and locked by hand tightening both nuts to a secure and comfortable fit around a person's waist area.

Then, the rope inner-spinner mechanism 56 is simply wrapped around this component right in the middle to glide, spin and to be dragged around the unit. It can also work real well by using the chain inner-spinner mechanism 84 and then, it also uses the leash attachment combo 70 (as listed earlier) is then connected.

Figure 17:
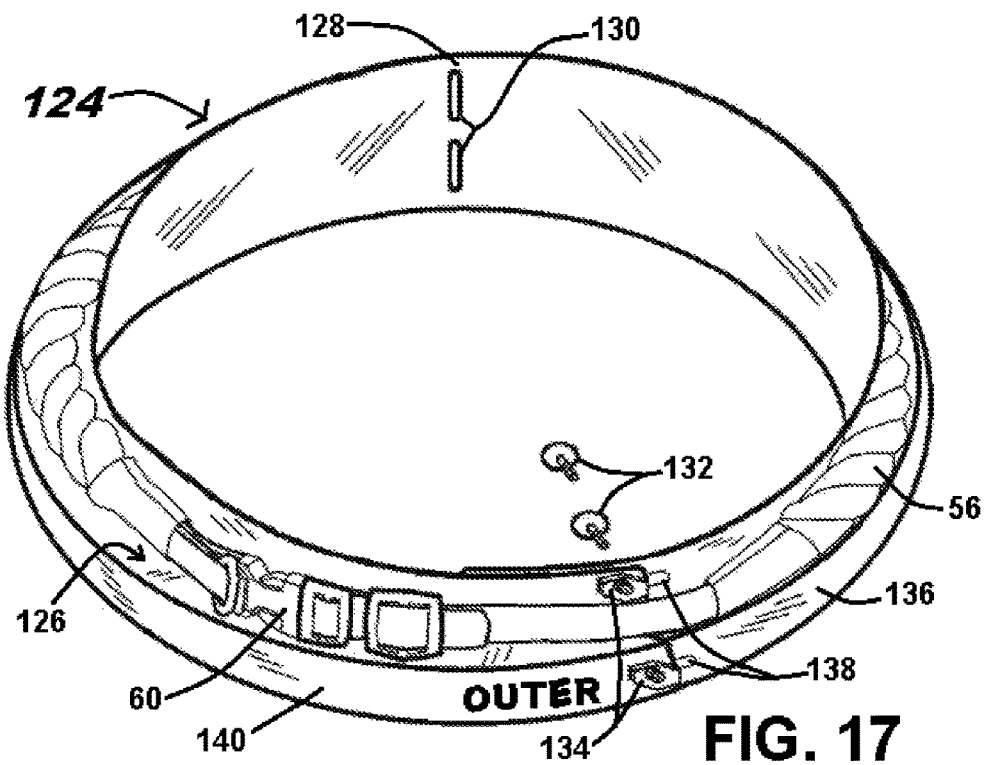
FIG. 17 is yet another embodiment of the invention in question showing the full front and, an elevated rear view of this one piece waist attachment component with the rope inner-spinner mechanism connected as it sits & rides above the outer shelf-like extension thereof.

FIG. 17 is a disclosure of yet another embodiment of this invention of a full 360 degrees hands-free leash attachment unit!

In FIG. 17, this drawing 124 shows a front and an elevated rear view of a flexible plastic type material or an alternate type of material that would be flat in shape, but has an outer ledge or shelf-like extension 126 that goes around the lower half of the full unit. The rear center 128 area of this one piece unit 124 is a little more flexible to allow it to open up widely by means of two slot-like elongated holes 130 and by an unseen gap in the shelf created in the same area to help with it's flexibility when being opened-up and closed inward to wrap around and attached to a person's waist. The front attachment and connection means consist of two short, flat and wide headed bolts 132 and two knob like nuts 134. And, on the right OUTER end 140, there are two bolt holes underneath the two nuts 134 and on the left end 136 of this unit, there is a partial view of two adjustable bolt hole slots 138 which are better seen in the next two drawings in FIGS. 18 & 19. This design also uses the same rope inner-spinner mechanism 56 of FIG. 5, and the same chain inner-spinner mechanism 84 of FIG. 11 and also, the same leash attachment combo 70 of FIG. 8 as shown earlier. As you can see, the rope inner-spinner mechanism 56 is simply wrapped around the middle of this unit and it just sits on top of the outer ledge or shelf like extension 126 of this unit 124. This rope inner-spinner's two piece dog collar 60 has been connected, adjusted and snap locked with a slight drag to allow it to easily spin around this unit 124. And then, you would just connect the large swivel hook of the leash attachment combo 70 component with the leash already attached to the large o-ring 74.

Figure 18:
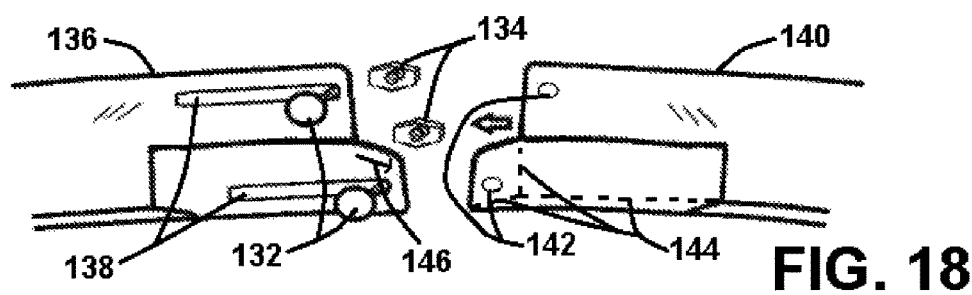
FIG. 18 is showing an elevated inside view of the front connection area of the embodiment in FIG. 17 with bolts & nuts from the inside to the outer in an open and unattached position thereof.

This drawing in FIG. 18 is showing a partial and sectional elevated inside view of the front connection area from the inside out of this unit 124. In this perspective view you can clearly see how the connecting, adjusting and locking means are designed to work.

On the front of the left end 136, you can now see the full view of the two adjustable bolt hole slots 138, and, on the front of the right OUTER end 140 there are the two bolt holes 142. Also in this drawing, all of the broken lines 144 that are shown, represents a short section of the inside wall from the front of both sides that was removed for it's full adjustment length to allow them to be overlapped, and, for the lower bolt to have a closer access to the lower bolt hole slot and also, it helps to add more flexibility to the front of this unit too. Also, 146 shows from the rear to a forward direction of the design of the shelf-like extension.

Figure 19:
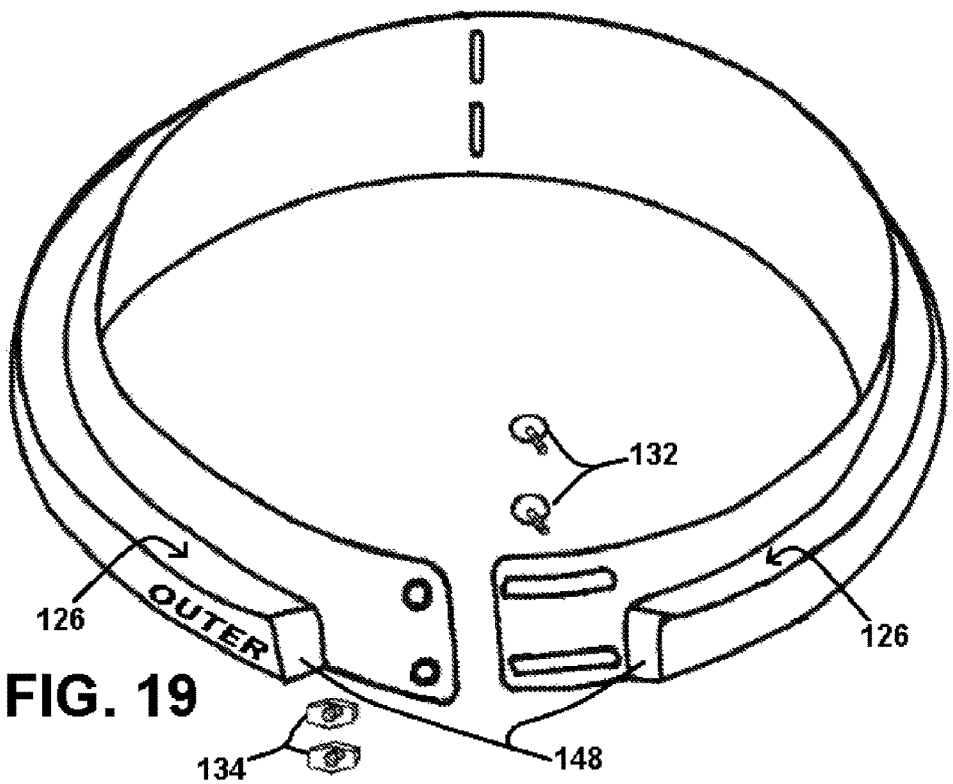
FIG. 19 is a drawing showing a full front and an elevated rear view with an alternate frontal connection design for the component of FIG. 17 thereof.

FIG. 19 is a plain opened and unconnected front and elevated rear view of the unit 124. But, this drawing is to mainly show an alternate front 148 attachment and connecting design and, a good view of the shelf like extension 126 to which an inner-spinner mechanism will just sit on top of to perform any kind of directional movement and functionality acquired.

Also, as you can see again the two bolts 132 and the two nuts 134 are shown in plain view.

TO MAKE? This component piece would be made mainly from a flexible-semi-rigid plastic or the like. It will be flat in shape with ventilation slots, but there will be a lower shelf added from center all the way down to the bottom or, it could even be a sturdy ledge type extension added just in the middle or lower area of the waist component during it's molding and manufacturing process. And again, the rear has to be flexible, so there need to be two elongated holes added in the rear center area and, a portion of this shelf must have a gap in the rear section center to allow it to open up to be wrapped and attach around a person's waist area. This waist attachment component will also need two bolt holes added to the right OUTER end, one on the top and one on the bottom and, also two adjustable bolt hole slots on the left end for the front connection and locking area.

TO USE? First, you would have to install the two bolts 132 by placing the threads through the two adjustable bolt hole slots 138 of the left end 136 from inside to out, and then, just overlap this end with the right OUTER end 140 and shove these bolts through the right OUTER end's 140 two bolt holes 142 then add the two knob like nuts 134 to lock in place.

Then, the rope inner-spinner mechanism 56 is simply wrapped around this component and placed on top of it's shelf like extension 126 to slide around the unit. This design can also be used with the chain inner-spinner mechanism 84 and then, the leash attachment combo 70 (as listed earlier) is then connected.

Figure 20:
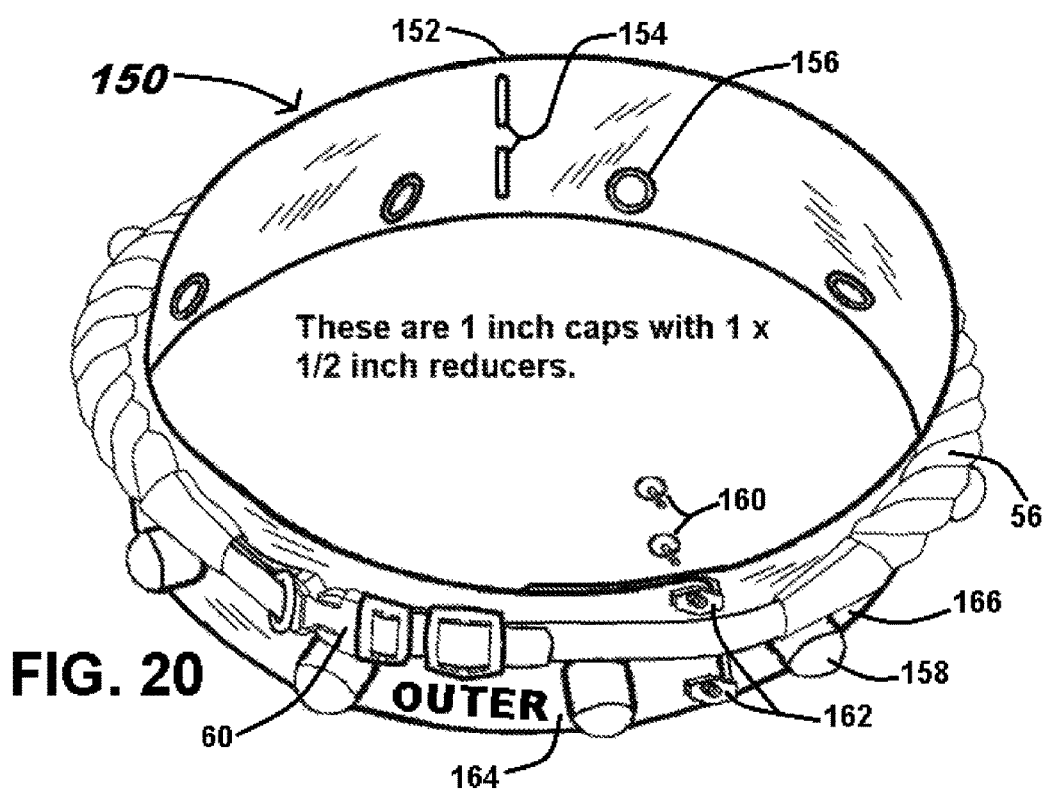
FIG. 20 is a drawing showing the 4th and final embodiment of the invention in question with a full front & elevated rear view of it's waist component with PVC plastic pipe reducers and caps installed around it and the rope inner-spinner mechanism attached around it thereof.

FIG. 20 is yet another (and the last) disclosure of an embodiment for this present invention. This is a front and an elevated rear view of this full 360 degrees hands-free leash attachment unit 150. The waist component for this unit 150 consist of a single piece of flexible plastic, metal or any other type of flexible material, The rear center 152 is a little thinner to add more flexibility with the help of two elongated holes 154.

The main component have perfect size holes beneath it's middle area that goes around the full length of the unit. These holes are being used for an inside-to-out installation of PVC plastic pipe reducers 156. The reducers extended end will be used to attach/push-on PVC plastic pipe caps 158 all around the outside of this unit 150. These holes are also spaced out and are better seen in FIG. 22. The ends of this unit also overlaps each other and are connected, adjusted and locked securely around a person's waist, which is done by overlapping the left end 166 that has two (unseen) adjustable bolt hole slots, with the right OUTER end 164 that has the two (unseen) bolt holes. And, there are two thin but wide headed bolts 160 and two large knob like hand tightening nuts 162 that are being used to securely lock it on. This unit 150 also uses the same rope and chain inner-spinner mechanisms and the same leash attachment combo.

As you can see, the rope inner-spinner mechanism 56 is simply wrapped around the middle of this unit and sits right on top of all the PVC plastic pipe caps 158 and just glides, spins around and is dragged around this unit 150 outer wall.

Figure 21:
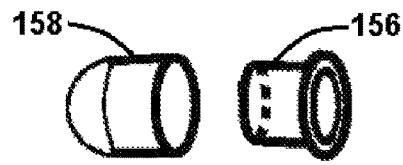
FIG. 21 is showing a slightly enlarged perspective view of a PVC plastic pipe cap and a reducer used on the unit in FIG. 20 thereof.

FIG. 21 is simply an enlarged perspective plan view of a PVC plastic pipe cap 158 and, a PVC plastic pipe reducer 156 used for component in unit 150.

Figure 22:
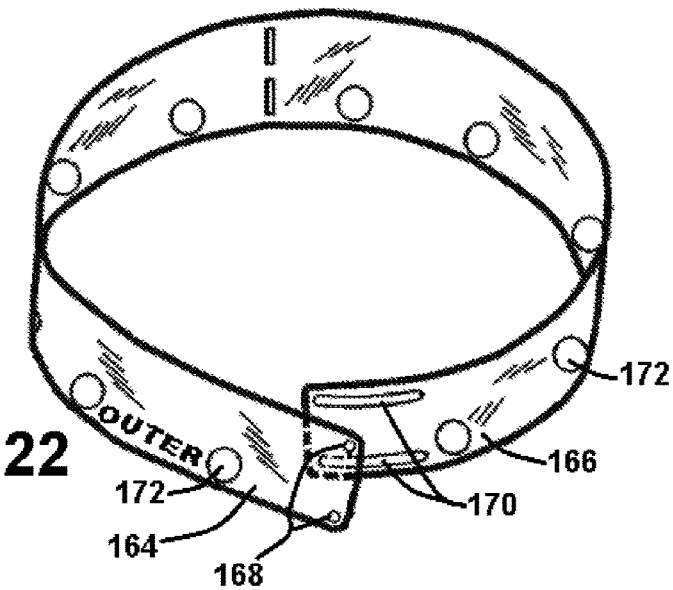
FIG. 22 shows a front & elevated rear plain view of the waist component of FIG. 20 in an open position without any other parts installed thereof.
Figure 23:
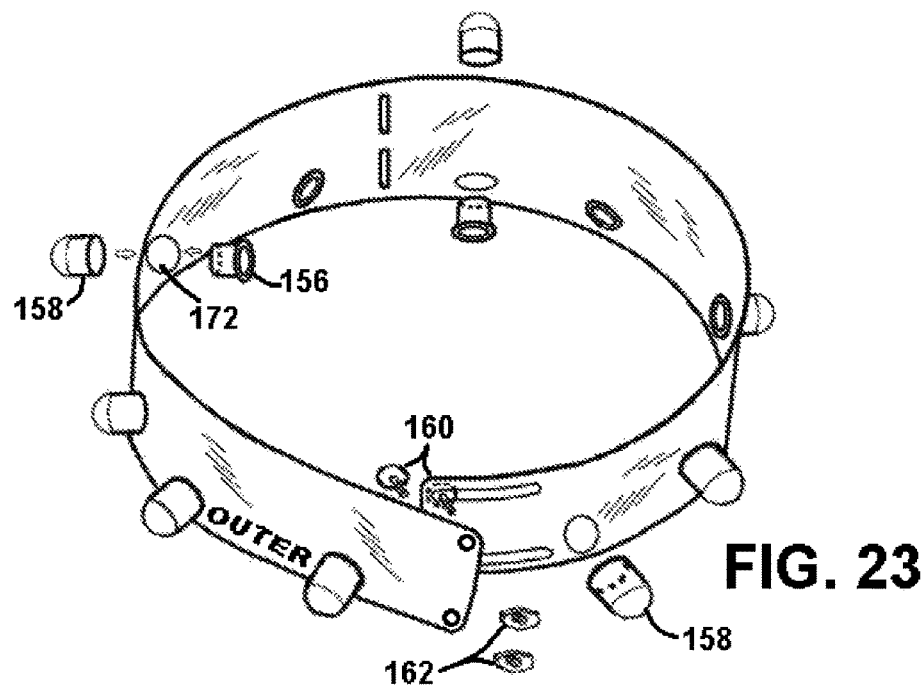
FIG. 23 is a drawing showing another front & elevated view of the waist component of FIG. 20 in an open position with all of it's plastic pipe reducers, caps and, it's bolts & nuts thereof.

FIG. 22 is a drawing showing a plain view of unit 150 waist attachment component of FIG. 20. You can now see the right OUTER end 164 of this unit two bolt holes 168, and the left end 166 two bolt hole adjustable slots 170. Also, there is now a good view of this waist component's holes 170 beneath it's middle area which goes around the full length of this unit, that is being used to permit the installation of all PVC reducers 156 to be installed from inside out.

During a month after month after month long worldwide search for any prior art patent applications that was identical to, close to, designed like, looked like, had obviousness, contained the same parts/elements/components like, had the same functionality and the same claims like the present invention, could not be found!

SO, PRIOR ART PATENT APPLICATIONS TO MY KNOWLEDGE COMPARED TO THE PRESENT INVENTION and ALL OF IT'S OTHER EMBODIMENTS, DOES NOT EXIST!!!

NOTE! Although various embodiment of drawings have been described, it is to be understood that the present invention contemplates numerous variations, options, and alternatives, but to not take away the functionality, designs and spinning ability of these units to work freely!

What I claim is:

1. A hands-free leash attachment unit, comprising:
    a flexible outer hose shaped as a ring and having an innermost perimeter facing a center point of said ring and an outermost perimeter opposite said innermost perimeter, said flexible outer hose having a longitudinal length and a slot extending said longitudinal length along said outermost perimeter of said flexible outer hose;
    a pad located on said innermost perimeter of said flexible outer hose;
    a corrugated inner hose shaped as a ring, said corrugated inner hose being placed within a hollow of said flexible outer hose and having a longitudinal length and a slot extending said longitudinal length of said corrugated inner hose and along an outermost perimeter of said corrugated inner hose;
    an innermost ring being one of a rope or a chain, said innermost ring being placed in a hollow of said corrugated inner hose so that said corrugated inner hose is between said flexible outer hose and said innermost ring;
    whereby said innermost ring is configured to move independently of said flexible outer hose within said hollow of said corrugated inner hose.

2. The hands-free leash attachment unit of claim 1, comprising: said flexible outer hose being defined by a first end portion and a second end portion, whereby said first end portion of said flexible outer hose is configured to be placed within said hollow of said flexible outer hose, overlap said second end portion of said flexible outer hose and lock into said second end portion of said flexible outer hose by pressing said first end portion against said second end portion, said outer hose is configured to be placed around a waist of a user, said flexible outer hose further having a pull-out strap attached to said first end portion and configured to assist in separating said first end portion from said second end portion.

3. The hands-free leash attachment unit of claim 1, comprising: said corrugated inner hose being defined by a first end portion and a second end portion, said first end portion of said corrugated inner hose is configured to overlap said second end portion of said corrugated inner hose and lock into said second end portion of said corrugated inner hose by pressing said first end portion of said corrugated inner hose against said second end portion of said corrugated inner hose, said corrugated inner hose further having a pull-out strap attached to said first end portion of said corrugated inner hose and configured to assist in separating said first end portion of said corrugated inner hose from said second end portion of said corrugated inner hose.

4. The hands-free leash attachment unit of claim 1, comprising: said innermost ring further having a first end and a second end, said innermost ring further having a first portion of a dog collar attached to a first end of said innermost ring and a second portion of a dog collar attached to a second end of said innermost ring, whereby said innermost ring in combination with said dog collar is configured to connect, disconnect and adjust around the inside of said flexible outer hose within said hollow of said corrugated inner hose, whereby said innermost ring is configured to receive a leash attachment.

* * * * *